Dec. 28, 1943. G. G. LANDIS 2,338,000
ELECTRODE HOLDER
Filed Aug. 20, 1942
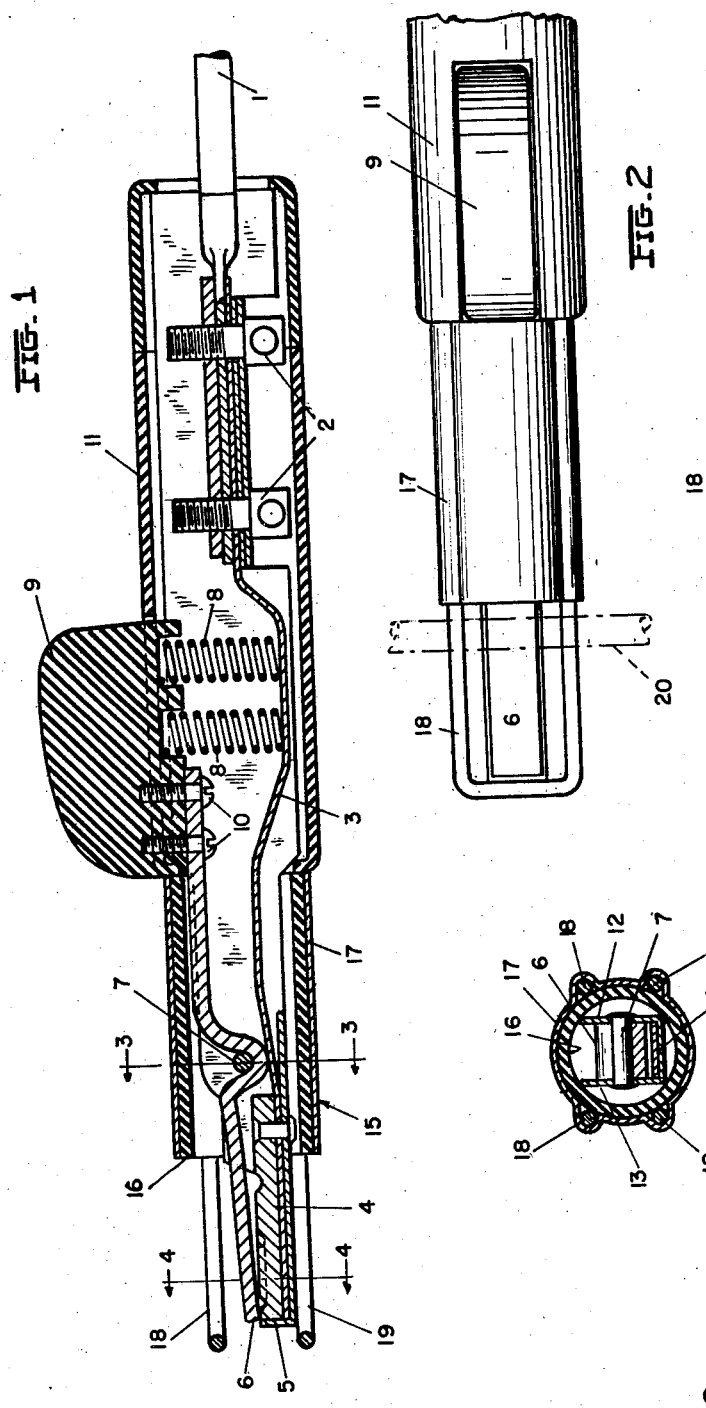
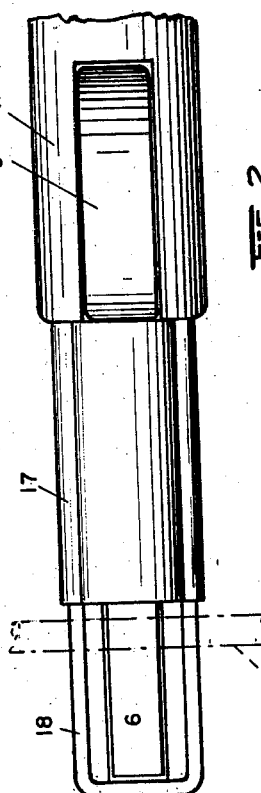
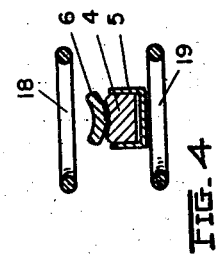
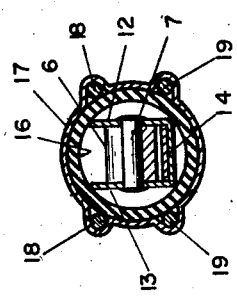
INVENTOR.
GEORGE G. LANDIS
BY Oberlin, Limbach & Day.
ATTORNEYS Patented Dec. 28, 1943

2,338,000

UNITED STATES PATENT OFFICE 2,338,000

ELECTRODE HOLDER

George G. Landis, University Heights, Ohio, assignor to The Lincoln Electric Company, Cleveland, Ohio, a corporation of Ohio Application August 20, 1942, Serial No. 455,445

6 Claims. (Cl. 219—8)

This invention relates as indicated to electrode holders and more especially to holders used in so-called manual arc welding operations wherein one lead of the welding circuit is connected to the work, and the other lead is removably connected through a suitable holder to a fusible electrode which is presented during the welding operation in arcing relation to the work.

Since the welding operation is usually performed at a point remote from the welding current supply, temporary interruptions in the welding process are generally not accompanied by a deenergization of the welding leads. If the operator should lay the electrode holder on the work during any of such intervals, or if he should permit the electrode holder to strike any part in electric communication with the work, damage to the holder and the work would result, unless some means is provided to insure against such accidental closing of the welding circuit.

This invention relates to a holder so constructed that the only electrical connection which may be established between the welding lead and the work must be through the electrode held by the jaws of the holder.

There have been many attempts made to provide a satisfactory holder for this purpose. Thus far, none of such efforts have been fully successful. The reasons for the failure of the prior art structures has been generally attributable to the following factors:

(a) The rough usage to which any such tool is subjected;

(b) The high temperatures to which the tool is subjected by being in the vicinity of the arc. This is especially true at those times where the electrode has become nearly consumed and the arc is accordingly maintained close to the holder;

(c) The spatter of molten metal which occurs particularly when welding on vertical or overhead surfaces.

The foregoing are but a few of the rigorous conditions which exist which have given rise to early failure, or rendered entirely unsatisfactory those holders heretofore available.

It is a principal object of my invention to provide a holder of the character described which not only satisfies the requirements specified, but is also capable of withstanding the rough usage and the like enumerated above.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a longitudinal section through an electrode holder containing one embodiment of my invention;

Fig. 2 is a top plan view of the lefthand portion of the holder illustrated in Fig. 1;

Fig. 3 is a transverse sectional view of the structure shown in Fig. 1, taken on a plane substantially indicated by the line 3—3; and Fig. 4 is a transverse sectional view of the structure illustrated in Fig. 1, taken on a plane substantially indicated by the line 4—4.

Referring now more specifically to the drawing, the holder illustrated in Fig. 1 is constructed generally in accordance with the principles of construction shown in the patent of Hoenie and Malner, No. 2,261,373, issued Nov. 4, 1941, in that the welding lead 1 is removably secured by means of studs 2 through a conductor 3 to an electrically conductive element 4, carried by the lower of two jaws 5 and 6. A fulcrum pin 7 supports the upper jaw 6 for pivotal movement, and such jaw is urged into clamping engagement with the other jaw by means of springs 8.

An upwardly projecting block 9 of electric insulating material secured by means of screws 10 to the rear end of the jaw 6 is utilized as the means for moving such jaw into and out of clamping engagement with the electrode inserted between the two jaws.

As indicated, the construction of the main portion of the electrode holder, by which a pair of electrode gripping jaws is provided, forms no part of the present invention. My present invention is applicable to any electrode holder which is provided with an electrically conductive assembly comprising welding lead connecting means and forwardly extending electrode gripping jaws. My invention consists in the combination with any such holder of an improved means whereby all parts of the holder, including the jaws, are maintained out of electrical contact with any flat surface such as a work plate with which the holder may come in contact, so that the only means of shorting the welding lead is through the welding electrode.

Such improved means in the embodiment illustrated in the drawing may be divided into primary and secondary parts. The secondary part comprises a tubular body 11 of electrical insulating material enclosing the rear portion of the above defined electrically conductive assembly and forming a handle whereby the operator may hold and manipulate the device. The tubular member 11 laterally encloses and supports those portions of the electrically conductive assembly previously defined. The tubular element 11 may be conveniently formed of a non-metallic, non-conductive material, such as a molded plastic or the like. It is, however, also within the contemplation of my invention to construct the element 11 of metal or other conductive material, and to provide means whereby the same is electrically insulated from the electrically conductive assembly inside the holder. This may be accomplished either by placing a metallic sheath around an element such as 11 shown in the drawing, or by making the element 11 metallic, and providing suitable insulating inserts between it and the elements of the electrically conductive assembly arranged therein.

The forward end of the electrically conductive assembly includes, as most clearly illustrated in Fig. 3, a trough-shaped metallic projection including legs 12 and 13 and a connecting portion 14. Such trough-shaped projection provides a support not only for the jaws 5 and 6 and the fulcrum pin 7, but also a support for the aforesaid primary part or insulating cage about the jaws 5 and 6.

In the embodiment of my invention shown for purposes of illustration, this primary insulating member, generally indicated at 15, comprises a tubular member 16 of insulating material and an outer shell 17 completely enclosing the tubular member 16. The member 16 has an inner diameter such that it frictionally engages the edges of the legs 12 and 13.

Secured to the shell 17 and extending forwardly thereof, from the locations most clearly illustrated in Fig. 3, are plural, circumferentially spaced, elongate members in the form of two U-shaped wire guards 18 and 19. These wire guards provide a cage about the jaws of the holder such that when the holder is placed against a flat surface in any position, this cage will prevent the jaws from coming in contact with such surface.

At this point it should be noted that this wire cage may be variously fashioned. For example, instead of using two U-shaped members as shown in the drawing, four straight wires might be used, projecting forwardly and laterally of the jaws in the positions illustrated in Fig. 3. However, such construction would not be as rigid as the U-shaped members illustrated. Other modified forms of cages may be used without departing from the spirit of this invention.

The U-shaped members 18 and 19 are, however, a preferred construction for the reason that they provide a maximum of rigidity with a minimum of interference with the manipulation of the holder and the procedure of placing an electrode between the jaws of the holder.

At this point it should be noted that the preferred arrangement of these U-shaped members 18 and 19 is such that they occupy parallel planes on opposite sides of the plane occupied by the electrode, the latter being illustrated diagrammatically at 20 in Fig. 2. When the U-shaped members are thus arranged, they offer no obstruction to the normal procedure of placing an electrode in the holder while at the same time providing a complete cage around the jaws.

In the preferred embodiment of my invention, the shield 17 is of metal and the U-shaped members 18 and 19, comprising the cage, are of flexible metal, such as wire. In this way, the cage around the jaw end of the holder is formed entirely of material which is capable of withstanding the rough usage to which it will be subjected in use, and will likewise not deteriorate when splashes of molten metal strike it. The flexibility of the cage is an advantage in that such metal as does splash against it and freeze on the cage may be quickly removed by merely striking the tool against a solid surface which will flex it enough to free it of all foreign material adhering thereto.

For certain types of use, it may be desirable to provide additional insulating material over the outer surfaces of either the shell 17 or the cage members, or both. However, for most forms of construction, this will not be necessary.

One would normally expect that the provision of a cage, such as that illustrated in the drawing, about the jaws of the electrode would interfere with the welding operation and would cause the operator to discard electrode stubs of greater length than when such cage is not present. The use of my improved holder under actual welding conditions, however, has shown that the opposite is the case. Where heretofore there has always been the danger of the welding operators touching the jaws, or other uninsulated parts of the holder, to the work, usually resulting in damage to the work, this hazard has caused them to discard electrode stubs of substantial length. That is, a fusible electrode was discarded as soon as the electrode became so short as to bring the jaws of the holder near the work. While using my improved holder, however, the electrode may be consumed down to the very point where the cage itself strikes the work, and thus actually, operators using a holder provided with such a cage use more of the electrode than when the cage is not present.

There are numerous other advantages which accompany the use of the electrode holder described above. However, it is believed unnecessary to more particularly refer to them at this point.

Other modes of applying the principle of the invention may be employed, change being made as regards the details described, provided the features stated in any of the following claims or the equivalent of such be employed.

I, therefore, particularly point out and distinctly claim as my invention:

1. An electrode holder comprising an electrically conductive assembly including welding lead connecting means and electrode gripping jaws, an insulated handle enclosing said assembly, said jaws projecting beyond one end of said handle, and insulated wire-like members extending from said handle and forming an open protective cage about said jaws.

2. An electrode holder comprising an electrically conductive assembly including welding lead connecting means and electrode gripping jaws, an insulated handle enclosing said assembly, said jaws projecting beyond one end of said handle, and insulated members of flexible material extending from said handle and forming an open protective cage about said jaws.

3. An electrode holder comprising an electrically conductive assembly including welding lead connecting means and electrode gripping jaws, an insulated handle enclosing said assembly, said jaws projecting beyond one end of said handle, and insulated flexible wires extending from said handle and forming an open protective cage about said jaws.

4. An electrode holder comprising an electrically conductive assembly including welding lead connecting means and electrode gripping jaws, an insulated handle enclosing said assembly, said jaws projecting beyond one end of said handle, and insulated U-shaped wire guards extending from said handle alongside said jaws.

5. An electrode holder comprising an electrically conductive assembly including welding lead connecting means and electrode gripping jaws, an insulated handle enclosing said assembly, said jaws projecting beyond one end of said handle, and an insulated shield for said jaws, said shield including plural U-shaped wire guards extending from said handle alongside said jaws and disposed with their outer ends in cross relation to each other so as to leave a clear space for an electrode held between said jaws.

6. An electrode holder comprising an electrically conductive assembly including welding lead connecting means and electrode gripping jaws, an insulated handle enclosing said assembly, a portion of the latter, including said jaws, projecting beyond one end of said handle, and a shield for said jaws, said shield including a tubular member of insulating material fitted to such projecting portion of said assembly, a protecting shell surrounding said member, and plural wire guards held between said member and shell and extending alongside said jaws, said guards being disposed so as to leave a clear space for an electrode held between said jaws.

GEORGE G. LANDIS.